United States Patent
Mueller-Schneiders et al.

(10) Patent No.: US 8,050,460 B2
(45) Date of Patent: Nov. 1, 2011

(54) METHOD FOR RECOGNITION OF AN OBJECT

(75) Inventors: Stefan Mueller-Schneiders, Duesseldorf (DE); Christian Nunn, Hueckeswagen (DE); Mirko Meuter, Gruiten (DE)

(73) Assignee: Delphi Technologies, Inc., Troy, MI (US)

( * ) Notice: Subject to any disclaimer, the term of this patent is extended or adjusted under 35 U.S.C. 154(b) by 762 days.

(21) Appl. No.: 12/220,942

(22) Filed: Jul. 30, 2008

(65) Prior Publication Data

US 2009/0034798 A1 Feb. 5, 2009

(30) Foreign Application Priority Data

Jul. 30, 2007 (EP) .................... 07014924

(51) Int. Cl.
*G06K 9/00* (2006.01)
(52) U.S. Cl. ...................................... 382/104
(58) Field of Classification Search .......... 382/100–107; 340/907–913, 933–940; 348/113–120
See application file for complete search history.

(56) References Cited

U.S. PATENT DOCUMENTS

2005/0232469 A1  10/2005  Schofield et al.

FOREIGN PATENT DOCUMENTS

| EP | 1327969 | 7/2003 |
|----|---------|--------|
| JP | 11203458 | 7/1999 |
| JP | 2001-283391 | 10/2001 |
| WO | 03/093857 | 11/2003 |

OTHER PUBLICATIONS

"The Road Sign Recognition System—RS2" Internet Citation, 2000, XP002135353, Gerfunden im Internet.
Uwe-Philipp Kappeler: "Erkennung and Verfolgung von Leitpfosten zur Spurpradiktion" Sep. 30, 2003, Universitat Stuttgart 2073, XP002461061.
Barnes N et al: "Real-time Radial Symmetry for Speed Sign Detection" Intelligent Vehicles Symposium, 2004 IEEE Parma, Italy Jun. 14-17, 2004, Seiten 566-571, XP010727709 ISBN: 0-7803-8310-9.
Piccioli G et al: "Robust Method for Road Sign Detection and Recognition" Image and Vision Cumputing, Guildford, GB, bd. 14, Nr. 3, Apr. 1996, Seiten 209-223, XP002252733 ISSN: 0262-8856. Johansson B: "Road Sign Recognition from a Moving Vehicle" Internet Citation, 2002, XP00245638, Gefunden im Internet.
Japanese Office Action dated Jun. 15, 2010.
US 6,424,087, 11/2002, Shirai et al. (withdrawn)

*Primary Examiner* — Samir Ahmed
*Assistant Examiner* — Atiba Fitzpatrick
(74) *Attorney, Agent, or Firm* — Thomas N. Twomey

(57) ABSTRACT

The invention relates to a method for the prediction of the size to be expected of the image of a stationary object associated with a road in a picture of the environment in the field of view of a camera device which is in particular arranged at a motor vehicle and which has an image plane including image elements, wherein at least one relevant spatial zone from the field of view of the camera device is determined; wherein boundaries of the calculated projection onto the image plane of the at least one relevant spatial zone are determined in order to determine at least one relevant image zone; wherein a directional beam is determined for each of the image elements in the at least one relevant image zone, said directional beam including those spatial points from the field of view which would be projected onto the respective image element on a projection onto the image plane; and wherein at least one value for the size to be expected of the image of a road sign in the respective image element is determined for each of the image elements in the relevant image zone.

9 Claims, 2 Drawing Sheets

METHOD FOR RECOGNITION OF AN OBJECT

TECHNICAL FIELD

The present invention relates to a method for the prediction of the size to be expected of the image of a stationary object associated with a road, in particular of a road sign, in a picture of the environment in the field of view of a camera device which is in particular arranged at a motor vehicle and which has an image plane including image elements.

BACKGROUND OF THE INVENTION

Systems for the recognition of road signs can be used to inform the driver of a motor vehicle of the road signs at the road, for example by projection onto the windshield of the motor vehicle via a head-up display of a graphic representation of a road sign detected at the road. Systems for the recognition of road signs can, however, also be used as driver assistance systems, for example to automatically reduce the driving speed to the permitted maximum speed when speeding.

Cameras are used for road sign recognition which take the environment in front of the motor vehicle and examine it for the presence of road signs. A road sign recognition can, for example, be carried out in two stages. In a first stage (detection), it is then a question of locating potential candidates for images of road signs in a taken picture via a feature extraction. This can take place, for example, by means of a Hough transformation which serves for the recognition of geometrical shapes or by means of a color segmentation in which contiguous areas of the same color are recognized. The second stage (classification) has the object of first determining whether the respective candidate is actually an image of a road sign and, in the affirmative case, of then determining the type of the imaged road sign. This can be done, for example by means of template matching.

Such a road sign recognition, which is carried out by a data processing device, however, requires a high computing effort which results in a high computing time. The robustness of such a road sign recognition is furthermore insufficient.

SUMMARY OF THE INVENTION

It is the underlying object of the invention to provide a possibility to cut the computing effort on a recognition of stationary objects associated with a road and/or to increase the robustness of such a recognition.

This object is satisfied by a method of the initially named kind, wherein at least one relevant spatial zone from the field of view of the camera device is determined, with the at least one relevant spatial zone corresponding to possible positions of the object which are based on assumptions on the relative position of the object with respect to the road and on a predetermined or determined course of the road; with boundaries of the projection onto the image plane of the at least one relevant spatial zone calculated using the camera parameters of the camera device being determined in order to determine at least one relevant image zone; with a directional beam being determined for each of the image elements in the at least one relevant image zone, said directional beam including those spatial points from the field of view which would be projected onto the respective image element on a projection onto the image plane; and with at least one value for the size to be expected of the image of the object being determined for the respective image element for each of the image elements in the at least one relevant image zone from assumptions on the size of the object and from a distance range at which the directional beam associated with the respective image element intersects the at least one relevant spatial zone.

The distance and the height at which stationary objects, for example road signs, traffic light installations and the like, associated with a road are installed relative to a road are known. This information can be used, together with the predetermined or determined road course, to define one or more relevant spatial zones in the field of view of the camera device in which such stationary objects are to be expected.

Subsequently, the projection of the relevant 3D spatial zone or zones fixed in this manner onto the in particular digital 2D image plane can be calculated, with the camera parameters of the camera device being used for this purpose. The camera parameters are the extrinsic and intrinsic parameters of the camera device, with the extrinsic parameters describing the position and orientation of the in particular digital camera device in space and the intrinsic parameters, e.g. the focal length and the optical center in the image plane, describing the projection per se.

The image plane can consequently be divided into one or more image zones which are relevant for the recognition and which are located within the boundaries of the calculated projection of the relevant spatial zone or zones and into one or more other spatial zones which are located outside these boundaries. On a subsequent recognition of road signs, for example, such as was initially described by way of example, a search for images of road signs only has to be made in a relevant image zone since, in the remaining image zones which correspond to the other spatial zones in which no road signs are installed, no images of road signs are also to be expected. The computing time for the subsequent recognition can already hereby be reduced. In addition, the robustness of the total process is increased.

Then a respective directional beam is determined for each of the image elements which is located in the relevant image zone or zones, said directional beam representing in each case the spatial points which would be projected onto the respective image element on a projection, i.e. the directional beams are each determined by means of inverse projection of the respective 2D image element in the 3D space.

One or more values can then be determined for each of the image elements in the relevant image zone or zones from the distance range in which a directional beam intersects the relevant spatial zone or zones and from the knowledge of the sizes of the objects, with each value indicating a size to be expected of the image of an object which includes the respective image element. The size of the search zone around the respective image element can thus be correspondingly restricted on a subsequent recognition. The computing time of a subsequent recognition can hereby be further reduced and the robustness can be further increased.

If a picture is taken, a recognition of stationary objects associated with the road in the picture can then be carried out while taking account of the aforesaid values.

The present invention makes use of the fact that information on the positions and sizes of stationary objects associated with roads is known. Consequently, image zones in which images of the objects can generally be present and which are relevant for the recognition can be determined from relevant spatial zones and the sizes of the objects in the different zones of the relevant image zones can be predicted. A subsequent recognition can therefore be carried out faster and with a greater robustness.

The following recognition can furthermore be facilitated in that a tracking of a stationary object associated with the road takes place, i.e. a road sign detected once in a picture, for example, is tracked e.g. by means of a Kalman filter over a plurality of pictures while predicting the possible positions of the image of the detected roads in the respective next picture.

The at least one relevant spatial zone can include three spatial zones, with the first spatial zone being able to be disposed to the right of the road, the second spatial zone being able to be disposed to the left of the road and the third spatial zone being able to be disposed over the road.

A respective minimum value and a maximum value for the size to be expected of the image of the object in the respectively associated image element is preferably determined from the points of intersection of each directional beam with the boundaries of the at least one relevant spatial zone. The limits for the size of the search zone for the subsequent recognition can thus be fixed upwardly and downwardly. The at least one value for the size to be expected of the image of the object in the respective image element can, however, generally also be, for example, a mean value calculated from the respective minimum value and the respective maximum value, only the minimum value or the maximum value or any other value between the minimum value and the maximum value, with the size of the search zone then in particular being able to be provided with a tolerance for the size of the search zone.

It is generally possible for the aforesaid method to be carried out in operation, i.e. online and/or during the trip, for example when the current road course is determined and for the determination of the at least one relevant spatial zone to be based on the currently determined road course. The aforesaid method is, however, preferably already carried out offline and/or beforehand for a variety of predetermined road courses, with the at least one relevant image zone for each of the predetermined road courses and the at least one value for the size to be expected of the image of the object in the respective image element for each of the image elements in the relevant image zone being stored in a data structure or in a look-up table as a data set associated with the predetermined road course. If then the same current road course or a comparable current road course is determined in operation, the values for the size to be expected of the image of the object in each case does not have to be determined, but can rather be simply loaded from the data structure while avoiding the computation time effort associated with the determination of the values.

The present invention therefore furthermore relates to a method for the prediction of the size to be expected of the image of a stationary object associated with a road, in particular of a road sign, in an image of the environment in the field of view of a camera device which is in particular arranged at a motor vehicle and which has an image plane including image elements, wherein the road course is determined and a data set is loaded from a stored data structure, said data set being associated with the determined road course and including at least one relevant image zone and at least one value for the size to be expected of the image of the object in the respective image element for each of the image elements in the at least one relevant image zone, with the data set having been determined in accordance with the method described above.

The stored data structure preferably contains a plurality of data sets which each include at least one relevant image zone and a value for the size to be expected of the image of the object in the respective image element for each of the image elements in the at least one relevant image zone, with the data sets being associated with different road courses. That respective data set can then be called up for a currently determined road course whose associated road course best corresponds to the currently determined road course. It can, for example, be sufficient to store the data sets of a total of 15 different road courses, with one road course corresponding to a straight road and seven road courses corresponding to a left hand curve and seven road courses corresponding to a right hand curve, with the seven road courses of each curve direction corresponding to seven different radii.

Generally, a road course at least directly before the camera device or the motor vehicle can be described in good approximation by an arc of a circle. It is therefore preferred for the curve radius of the road to be determined for the determination of the road course. The or each of the relevant spatial zones then corresponds to a curved spatial zone which has a constant radius. The relevant spatial zone preferably extends only up to a maximum distance from the camera device.

In accordance with an embodiment of the invention, the curve radius of the road is determined from sensor data of the motor vehicle. Many motor vehicles are currently equipped with sensors which permit a curve radius to be determined which the motor vehicle is instantaneously following so that the provision of the sensor data is possible without any additional effort. The curve radius detected by means of the sensors can then be used for the description of the curve radius of the road located at least directly in front of the camera device or the motor vehicle. The radius can, for example, be determined from the speed and the yaw rate of the vehicle or from a steering angle of the vehicle.

It is generally also possible for the road course, in particular the curve radius of the road, to be determined from the picture itself and/or by a comparison of a plurality of sequentially taken pictures.

In accordance with a further embodiment of the invention, road markings of the road are detected and the road course, in particular the curve radius of the road, is determined by means of the detected road markings. Methods for the detection of road markings and for the determination of the road course from the road markings are generally known. The road markings enable the relevant spatial zone or zones to be determined particularly well.

A further subject of the invention is a computer program with programming code means to carry out the method described above when the program is carried out on a computer or on a corresponding computing unit.

A computer program product is also a subject of the invention having programming code means stored on a computer legible data carrier to carry out the method described above when the computer program is carried out on a computer or on a corresponding computing unit.

In this connection, a computer is understood as any desired data processing device with which the method can be carried out. They can in particular have digital signal processors and/or microprocessors with which the method can be carried out fully or in parts.

Finally, a subject of the invention is a device for the prediction of the size to be expected of the image of a stationary object associated with a road, in particular of a road sign, in a picture of the environment in the field of view of a camera device, in particular arranged at a motor vehicle, having a data processing device which is made for the carrying out of the method described above. A camera device for the taking of a picture and/or a device for the determination of a road course are preferably additionally provided.

Further preferred embodiments of the invention are recited in the dependent claims, in the description and in the drawing.

BRIEF DESCRIPTION OF THE DRAWINGS

The invention will be described in the following by way of example with reference to the drawing. There are shown, schematically in each case.

DESCRIPTION OF THE PREFERRED EMBODIMENT

Figure 1:
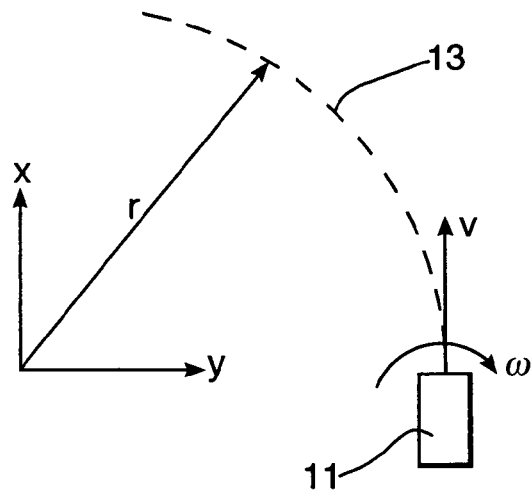
FIG. 1 is a representation for the explanation of the determination of the road course.

In FIG. 1, a motor vehicle 11 driving on a road is shown in a plan view at whose front end a forwardly directed digital video camera (not shown) is attached to take pictures of the environment of the motor vehicle 11 in the field of view of the digital video camera. The pictures are projected onto an image plane of an image sensor of the digital video camera including image elements to search for images of road signs located at the road in the pictures.

As is shown in FIG. 1, the curve radius r which the motor vehicle 11 follows at a respective point in time can be determined from the speed v and the yaw rate ω of the motor vehicle 11, with $$r = v/\omega$$

applying.

The speed v and the yaw rate ω can be determined by corresponding sensors. Alternatively, the curve radius r can also be determined by a steering angle sensor of the motor vehicle 11. It is furthermore also possible for the curve radius be to be determined from the images which are themselves taken by the digital video camera, for example by detection of the road markings.

The determined curve radius r is used to predict the further travel path 13 of the motor vehicle 11 which has a left hand curve in FIG. 1, with the further travel path 13 being equated, for example, with the center of the road or lane.

Subsequently, a data set associated with the predicted further travel path 13 is loaded from a data store and includes relevant image zones in which images of road signs can occur and a minimum value and a maximum value for the size to be expected of the image of a road sign in the respective image element for each of the image elements in the relevant image zones, with the data set having been determined as described in the following.

Figure 2:
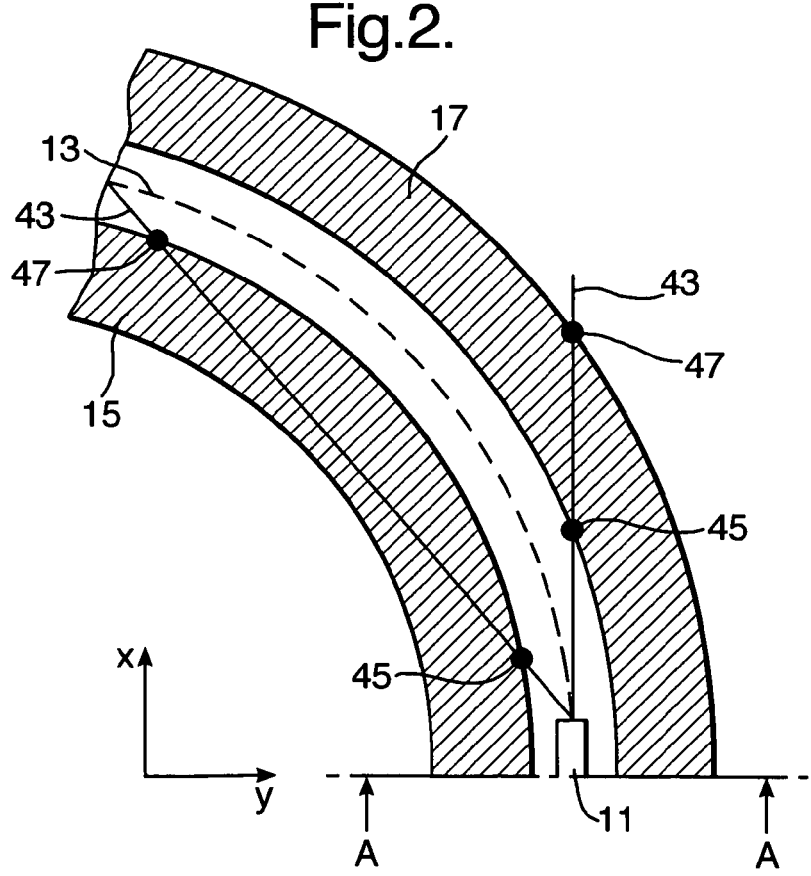
FIG. 2 is a plan view of a motor vehicle, with a first relevant spatial zone located to the left of a road and a second relevant spatial zone located to the right of a road being shown.
Figure 3:
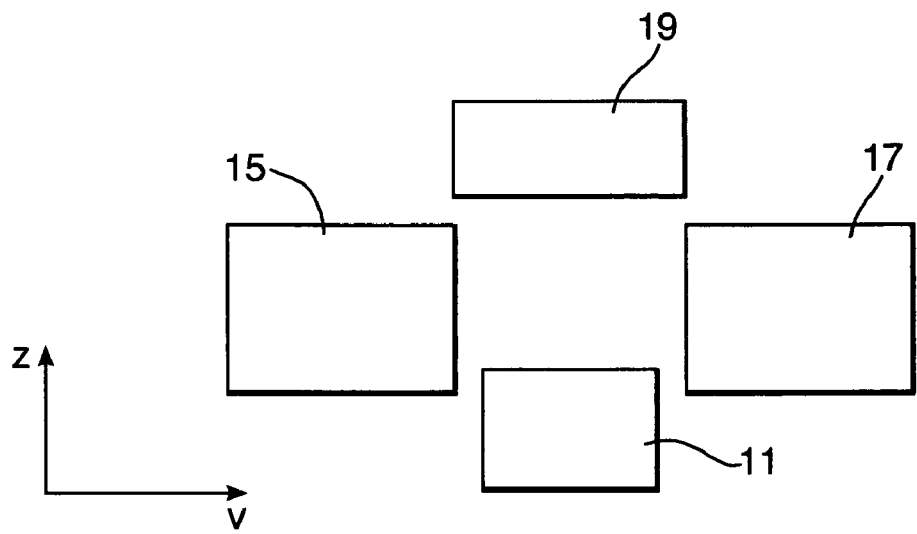
FIG. 3 is a cross-sectional view along the line A-A in FIG. 1, with a relevant spatial region located above the road being added.

Relevant imaginary spatial zones in which road signs can occur can be determined from a curve radius r of a road and from the knowledge of relative locations of road signs with respect to the road or the lane. It can, for example, be assumed that road signs are installed at a distance of between 0.5 m and 1.5 m from a road and at a height of between 1.3 m and 3.5 m above the road plane or are fastened to bridges, flyovers and the like extending above the road at a height of at least 3.0 m. Such relevant spatial zones determined by way of example are shown in FIGS. 2 and 3, with a relevant spatial zone 15 located to the left of the travel path 13 and a relevant spatial zone 17 to the right of the travel path 13 being shown in FIG. 2 and additionally a relevant spatial zone 19 located above the road being shown in FIG. 3. It can be seen from FIG. 2 that the relevant spatial zone 15 located to the left of the travel path 13 has a larger curvature and the spatial zone 17 to the right of the travel path 13 has a lower curvature than the travel path 13 itself.

Figure 4:
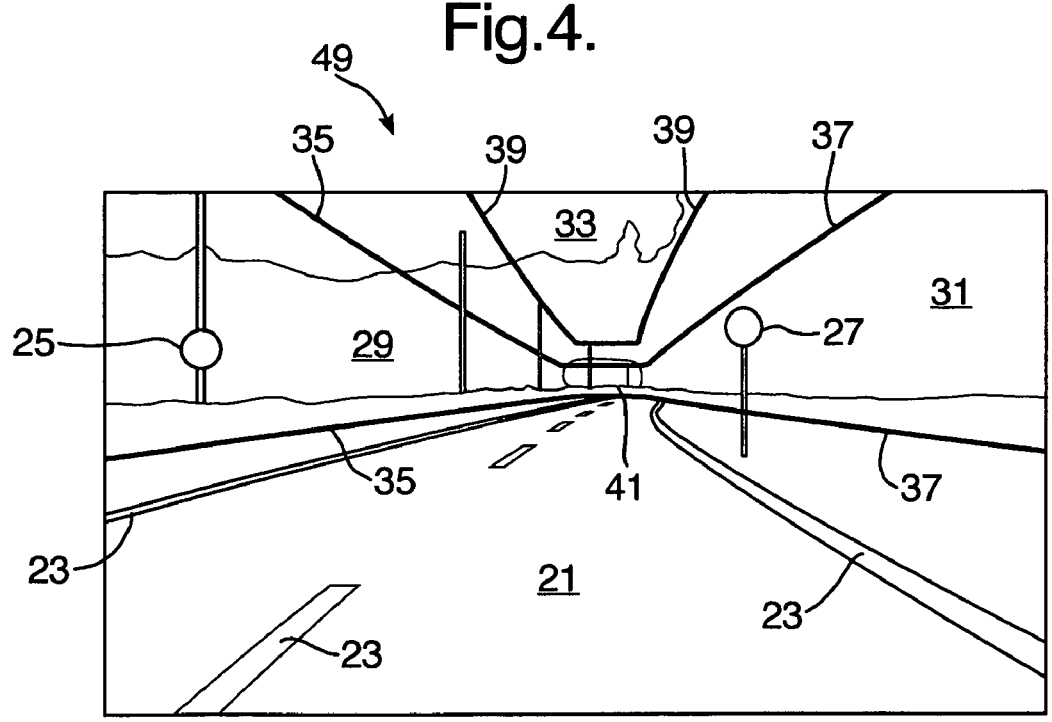
FIG. 4 is a picture taken by means of a camera device in which relevant image zones are shown.

Relevant spatial zones such as are shown by way of example in FIGS. 2 and 3 can now be projected onto the image plane of the camera while using the camera parameters of the camera, whereby relevant image zones 29, 31, 33 associated with the relevant spatial zones arise, as can be recognized in FIG. 4. It must be noted at this point that the relevant image zones 29, 31, 33 shown in FIG. 4 have not arisen from the projection of the relevant spatial zones 15, 17, 19 shown in FIGS. 2 and 3, but rather from the projection of relevant spatial zones which were determined with respect to a travel path slightly curved to the right. In this connection, the relevant image zone 29 corresponds to a relevant spatial zone located to the left of the road; the relevant image zone 31 corresponds to a relevant spatial zone located to the right of the road; and the relevant image zone 33 corresponds to a spatial zone located above the road. The relevant image zones 29, 31, 33 are surrounded by boundaries 35, 37, 39 of the relevant image zones 29, 31, 33. Images of road signs can only occur inside these boundaries 35, 37, 39, i.e. in the relevant image zones 29, 31, 33.

A zone 41 of the image plane which is disposed approximately at the center in FIG. 4, in which the two relevant image zones 29, 31 run toward one another and which corresponds to a spatial zone of a larger distance from the camera or from the motor vehicle is not used as the relevant image zone since at larger distances the differences in the actual further course of the road from the course of the road determined on the basis of the currently traveled curve radius increase and road signs still do not have any sufficient size for a reliable recognition.

A directional beam 43 is now determined for each of the image elements of the image plane which are located inside one of the relevant image zones 29, 31, 33, as is now again shown with reference to FIG. 2, with the respective directional beam 43 in each case including the spatial points from the field of view of the camera which would be projected onto the respective image element on a projection.

The points of intersection 45, 47 of each of the directional beams 43 is then determined with the boundaries of the relevant spatial zones 15, 17, with the first point of intersection 45 defining a minimum spacing and the second point of intersection 47 defining a maximum spacing in which road signs can be located with respect to the camera or to the motor vehicle which appear in the image element associated with the respective directional beam 43. A minimum spacing value and a maximum spacing value are thus assigned to each image element inside the relevant image zones 29, 31, 33.

A minimum value and a maximum value can then be determined for each of the image elements in the relevant image zones 29, 31, 33 from the knowledge of the sizes of road signs and the previously determined minimum and maximum distance values, said minimum and maximum values indicating a value range for the size to be expected of a road sign in the respective image element. Zones of the relevant image zones 29, 31, 33 which are disposed further outwardly in the image plane in this connection have higher values than zones of the relevant image zones 29, 31, 33 disposed further inwardly, since they correspond to spatial points of the relevant spatial zones 15, 17, 19 which have a larger distance from the digital video camera or the motor vehicle. The values in particular increase from the inside to the outside in each of the relevant image zones 29, 31, 33.

The method in accordance with the invention described above can be carried out for a plurality of different predetermined curve radii to generate a data set of values for each of the curve radii for the size to be expected of the image of a road sign. The aforesaid values can be precomputed offline for different curve radii and can be stored in a look-up table. If then a road sign recognition should be carried out, only the current curve radius has to be determined and the associated data set loaded.

A picture 49 of the environment in the field of view of the digital video camera taken by the video camera is shown by way of example in FIG. 4. The image 21 of a road, the image 23 of road markings, the image 25 of a first road signal installed to the left of the road seen in the direction of travel and the image 27 of a second road signal installed at the right at the edge of the road can be recognized in the picture 49, with the images 25, 27 of the road signs being located in the relevant image zones 29, 31, 33. Further imaged details of the environment, i.e. roadside posts, guardrails, trees, bushes, a flyover, etc., are only shown in an indicated manner for the sake of clarity.

The method in accordance with the invention makes it possible for the search for road signs to be restricted to the relevant image zones on a subsequent road sign recognition. The search in the relevant image zones is then facilitated in that, for each of the image elements located in the relevant image zones, values are present which provide information on the total size to be expected of a possible image of a road sign which would be imaged onto the respective image element and image elements located around the respective image element.

It is, however, generally also possible for the determination of the aforesaid values to be carried out during the trip on the underlying basis of the respective currently determined road course.

Furthermore, the method described above cannot only be used for a road sign recognition, but also for a recognition of other stationary objects associated with a road, for example, of traffic light installations.

The invention claimed is:

1. A method for predicting a size of an image of an object in a field of view of a camera device, said camera device having an image plane including image elements, the method comprising
    determining at least one relevant spatial zone in the field of view, said relevant spatial zone corresponding to a possible position of the object based on assumptions on the relative position of the object;
    projecting the relevant spatial zone onto the image plane, thereby forming a projection;
    computing boundaries of the projection using camera parameters of the camera device to determine at least one relevant image zone;
    determining a directional beam for image elements in the relevant image zone, said directional beam including spatial points from the field of view; and
    determining, for each image element in the relevant image zone, at least one value for an expected size of the image of the object from assumptions on the size of the object and from a distance range based on the intersection of the directional beam associated with the image element and the relevant spatial zone.

2. A method in accordance with claim 1, further comprising
    determining a minimum value and a maximum value for an expected size of the image of the object based upon points of intersection of the directional beam and the boundaries of the relevant spatial zone.

3. A method in accordance with claim 1, wherein the object is a road sign, and wherein the camera device is mounted on a motor vehicle, said method comprising
    determining a course of the road; and
    loading a data record based upon the determined road course from a stored data structure, said data record including the relevant image zone and the expected size of the image of the road sign.

4. A method in accordance with claim 3, wherein the stored data structure contains a plurality of data sets, each data set including at least one relevant image zone and at least one value for the expected size of the image, each said data set being associated with a different road course.

5. A method in accordance with claim 3, wherein determining the course includes determining a curve radius of the road.

6. A method in accordance with claim 5, characterized in that the curve radius is determined from sensor data of the motor vehicle including vehicle speed and a yaw rate.

7. A method in accordance with claim 3, characterized in that at least one picture is taken by the camera device and used for the determining the course.

8. A method in accordance with claim 3, wherein determining the course includes detecting road markings.

9. A non-transitory media comprising a computer-readable code configured to cause a computer to carry out a method for predicting a size of an image of an object in a field of view of a camera device, said camera device having an image plane including image elements, the method comprising
    determining at least one relevant spatial zone in the field of view, said relevant spatial zone corresponding to a possible position of the object based on assumptions on the relative position of the object;
    projecting the relevant spatial zone onto the image plane, thereby forming a projection;
    computing boundaries of the projection using camera parameters of the camera device to determine at least one relevant image zone;
    determining a directional beam for image elements in the relevant image zone, said directional beam including spatial points from the field of view; and
    determining, for each image element in the relevant image zone, at least one value for an expected size of the image of the object from assumptions on the size of the object and from a distance range based on the intersection of the directional beam associated with the image element and the relevant spatial zone.

* * * * *